BEST AVAILABLE COPY
A. GEISS.
Gas Burner for Cooking, &c.
No. 2,377. Reissued Oct. 16, 1866.
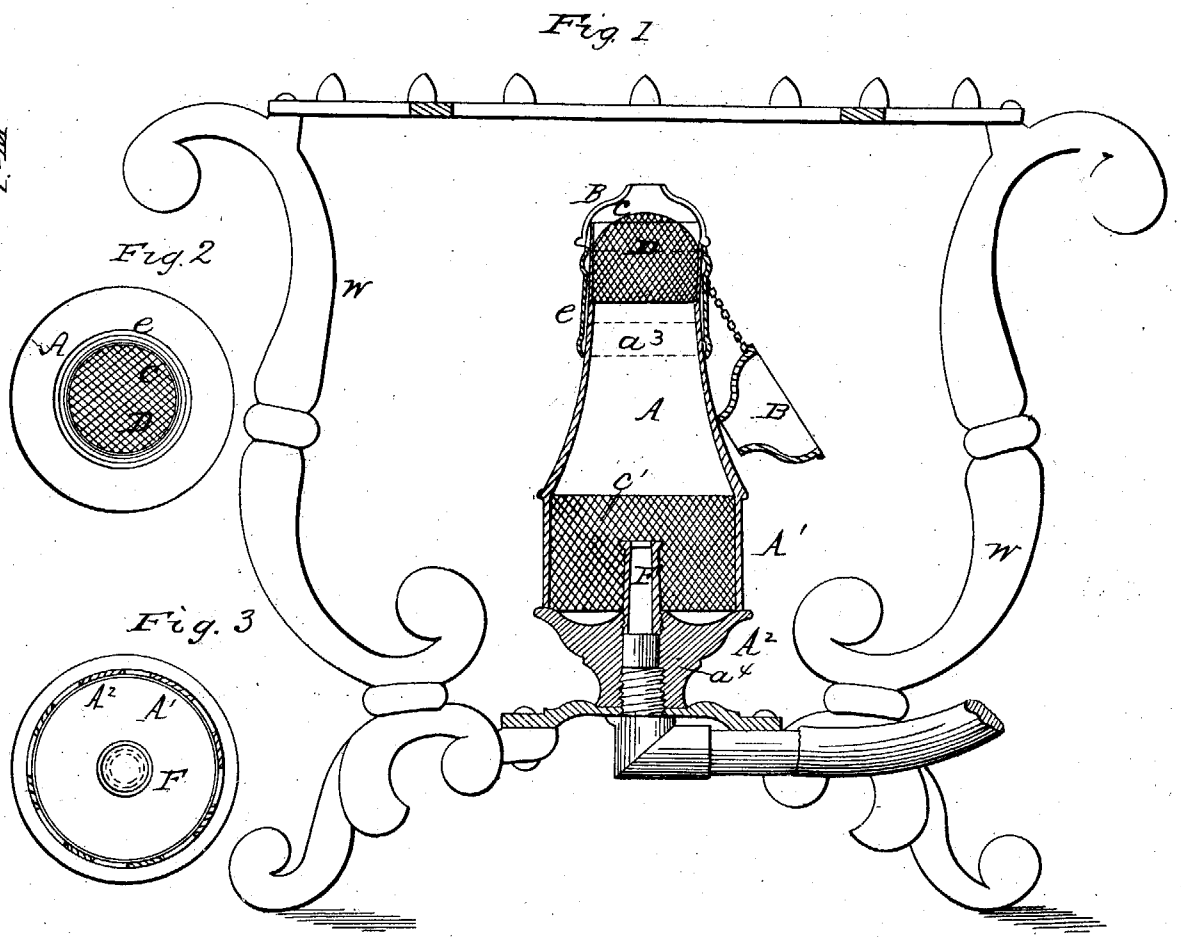
Witnesses
E. B. Forbush
B. H. Meechly
Inventor
A. Geiss
N. PETERS. Photo-Lithographer, Washington, D. C.

UNITED STATES PATENT OFFICE.

ADOLPH GEISS, OF BUFFALO, NEW YORK.

GAS-BURNER FOR COOKING, &c.

Specification forming part of Letters Patent No. 51,170, dated November 28, 1865; Reissue No. 2,377, dated October 16, 1866.

*To all whom it may concern:*

Be it known that I, ADOLPH GEISS, of the city of Buffalo, county of Erie, and State of New York, have invented new and useful Improvements in Gas-Burners; and I do hereby declare that the following is a full and exact description thereof, reference being had to the accompanying drawings, and to the letters of reference marked thereon.

My invention relates to a gas-burner for cooking or heating purposes, by which far more heat may be obtained than by the common burner, the same being easily and quickly applied and connected to ordinary gas-fixtures, rendering it peculiarly adaptable to the sick-room or nursery, or in any place where light cooking is required to be done.

Figure I is a vertical section of my improved gas-burner. Fig. II is a top plan. Fig. III is a transverse section of the same.

Letters of like name and kind refer to like parts in each of the figures.

A represents a central metallic draft-chamber, conical in form, and serving the double purpose of draft and mixing the gas with air before it reaches the point of combustion.

Below this chamber, and interposed between it and a metallic base, $A^2$, is placed a metal cylinder, $A^1$, which has several openings, O. Within this cylinder $A^1$ is placed a finely-perforated screen or wire-gauze shell, $e'$, for the purpose of further straining and sifting the air in its passage into the draft and mixing chamber A, and so as to deliver the air and gas in steady and uniform quantities to the dome for combustion.

A gas-pipe, F, is inserted into the metallic base $A^2$, with a screw-thread cut thereon, as shown at $a^4$, for easy connection with the ordinary gas-pipes used in dwelling-houses. This pipe projects into the perforated shell $e'$, as shown, and allows the gas to escape therefrom through small apertures in the top thereof.

The chamber A is surmounted by a perforated or wire-gauze dome, D. The lower part of the dome stands upon the upper end of the chamber A, and is held in place by the outside or holding thimble, $e$, which laps over the upper end of chamber A. In this overlapping part is formed an internal groove to receive projecting pins or ribs, as shown at $a^3$. Notches are made in this groove to allow the thimble $e$ to pass over the pins, and then, by a slight turn, the pins enter the groove and retain both thimble and dome in place.

Within this outside or holding thimble is placed a non-fusible metallic thimble, $c$, which projects above the outside thimble, as shown in the drawings. The object of this thimble is to contract the surface of the dome exposed to the outside air, increase the draft through the dome, and carry the point of ignition or combustion above the dome, so that the heat will not melt or fuse the wire-gauze forming the dome. If this device is not used combustion takes place so near the surface of the dome and the heat becomes so strong as to fuse the wire-gauze forming the dome; but with this device added the draft is increased, the exposed surface of the dome diminished, and the point of combustion carried so high above the dome as to avoid that difficulty. It also serves to throw the heat more directly and intensely upon the vessel standing upon the rack or frame, where the heat is required.

A conical cap, B, is provided, which may be placed over the dome D, for the purpose of concentrating the jet through the opening thereof whenever it may be required to use a feeble flame. When this cap is used the supply of gas should be diminished.

When a small flame is required for keeping articles in the vessel setting or standing upon the frame or rack warm, then the cap should be used. The cap is necessary in order to obtain such small feeble flame. The red lines B represent the cap in place.

This device is designed to be used in connection with the gas pipes or fixtures ordinarily used in dwelling-houses, and may be connected or disconnected therewith at pleasure. When properly connected with a gas-pipe the gas will issue through the pipe F, and coming in contact with the external air which passes in through the openings in the cylinder $A^1$ and the perforated shell $e'$, the gas and air become thoroughly mixed in the chamber A before reaching the point of combustion.

By means of the combination and arrangement of these parts combustion takes place slightly above the outer surface of the dome D, and the dome is thereby protected from injury by the flame, and the flame is carried to the point where most needed.

For the purpose of heating water and cooking therewith, any convenient cup, dish, or kettle may be used, and for this purpose may be set on the frame VI, or held over the dome in contact with the flame in any convenient manner. It is a cheap and simple device, and will be found very useful and convenient in the sick-room or nursery, or where simple preparations and light cooking only are required.

What I claim as my invention, and desire to secure by Letters Patent, is—

1. The draft and mixing chamber A, in combination and arrangement with the perforated dome D, perforated shell $e'$, and metallic base $A^2$, (including gas-pipe F,) for the purpose, and substantially as described.

2. In a gas-burner for cooking and heating purposes, the thimble $e$, in combination with the wire-gauze dome D, substantially as described.

3. The combination of the thimble $e$, wire-gauze dome D, and cap B, substantially as set forth.

4. The combination of the outer thimble, $e$, the inner and upper thimble, $e$, and dome D, for the purposes and substantially as set forth.

ADOLPH GEISS.

Witnesses:
E. B. FORBUSH,
B. H. MUEHLE.